United States Patent Office.

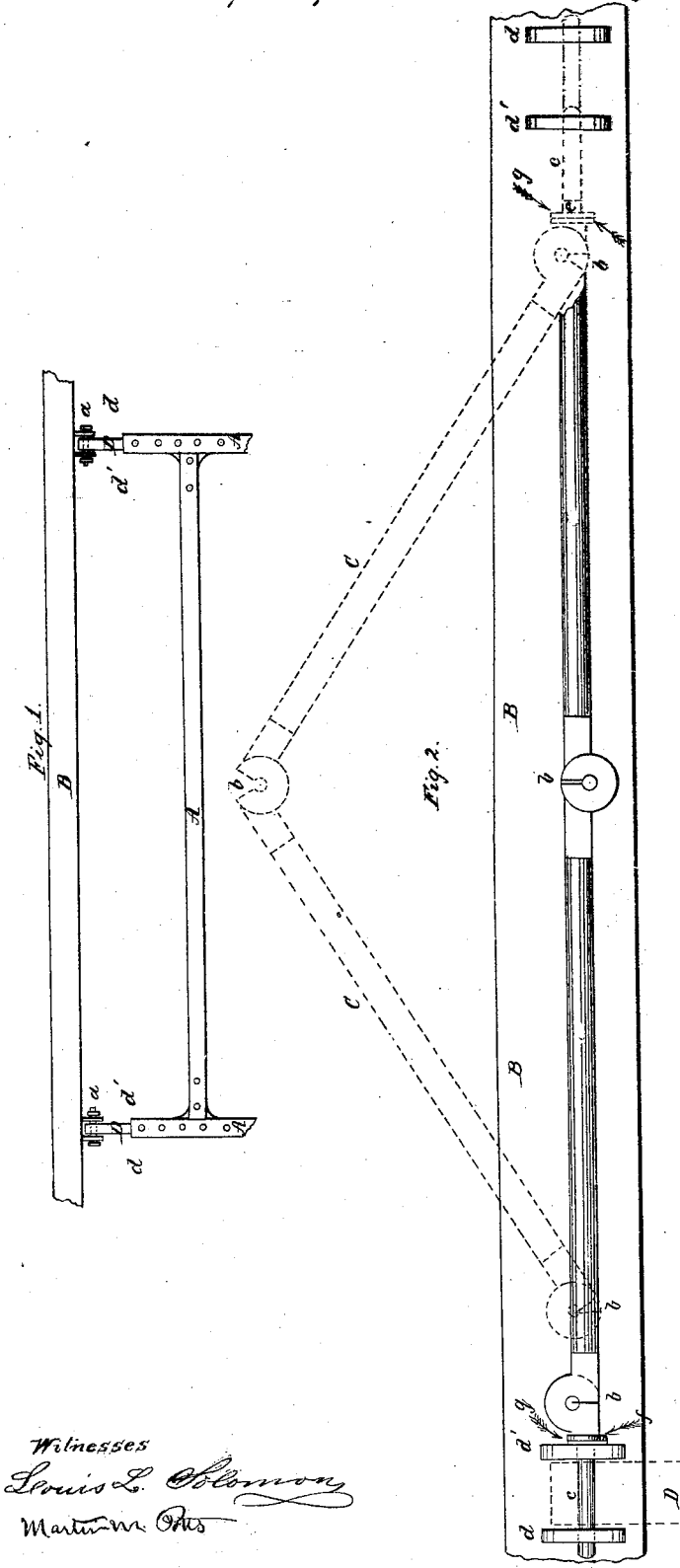

SMITH THOMPSON, OF MONTGOMERY COUNTY, MARYLAND, ASSIGNOR TO S. S. FAHNESTOCK, OF WASHINGTON, DISTRICT OF COLUMBIA.

Letters Patent No. 76,357, dated April 7, 1868.

IMPROVED MODE OF ATTACHING SHAFTS TO VEHICLES.

*The Schedule referred to in these Letters Patent and making part of the same.*

TO ALL WHOM IT MAY CONCERN:

Be it known that I, SMITH THOMPSON, of the county of Montgomery, and State of Maryland, have invented a new and useful Improvement in Attaching or Detaching Shafts or Tongues to Vehicles; and I do hereby declare that the following is a full and exact description thereof, reference being had to the accompanying drawings, and to the letters of reference marked thereon, in which like letters indicate like parts.

The nature of my invention consists in a jointed bar, to take the place of the usual nut-bolts, which secure the shafts or pole to the front axle, thus saving much time and trouble when necessary to change the one for the other.

To enable those skilled in the art to make and use my invention, I will proceed to describe its construction and operation. In the drawings—

Figure 1 represents the ordinary manner of attaching shafts, A, to an axle, B, by means of bolts, $a\ a$, having heads and nuts, or other fastenings. A pole can be attached in same manner, but the change necessitates the unscrewing of the nuts on bolts $a$, and replacing the same—in most if not in all instances an inconvenient and tedious operation. It need not be mentioned why a change from one to two horses, or *vice versa*, in the same vehicle is desirable. To remedy the old plan, I replace these screw-bolts by a jointed bar, C, having three joints, $b$, the extreme ends of which being so formed as to replace the bolts $a$, which pass through the clips or ears $d\ d'$, attached to front axle B at $e$. I form this part of $c$ square where it enters the clip $d'$. This is to prevent any turning of the bar C. Between the outer joints $b$ and the part $c$ is formed a shoulder, $f$, against which rests an elastic washer, $g$. The part $c$ is made long enough to pass through the two clips, and, of course, at same time, through the irons, D, entering the same, and which are secured to shafts or "tongue."

In red lines, Figure 2, the jointed bar C is shown in its raised position, the part $c$ being withdrawn from ears $d$, thus releasing the shafts or pole. A further upward movement releases it entirely from both sets of clips.

To attach either shafts or pole, the irons, D, of either, after being placed between the clips, it is only necessary, in order to secure the same, to push downward on central joint, $b$, thus straightening it, as shown in black lines in fig. 2, showing fully how the fastening is completed. The central joint $b$ is intended to pass its centre slightly, the bar there being somewhat depressed. This, in connection with the elastic washers, prevents any tendency to "bounce upward." Whilst it seems impossible this could happen, even to a small extent, certainly not to an injurious one, yet a turn-button, or a bolt over the joint, would secure it beyond peradventure. An elastic sleeve can be pulled over the joint, to answer a similar purpose, or it can be strapped down to the axle.

By attaching a strap or line to the bar C, near the central joint, and it passing up to the driver, the bar can be pulled up and out of the clips, thus releasing a runaway horse or horses with the shafts or tongue.

Having thus described my invention, what I claim as new, and desire to secure by Letters Patent of the United States, is—

The jointed bar C, constructed and operated in the manner substantially as shown and described, and for the purpose set forth.

SMITH THOMPSON.

Witnesses:
WILLIAM READ,
THOMAS J. HURDLE.